(12) United States Patent
Jeong et al.

(10) Patent No.: US 12,179,777 B2
(45) Date of Patent: Dec. 31, 2024

(54) METHOD OF DETERMINING DRIVING RESISTANCE IN INSUFFICIENT WARM-UP STATE

(71) Applicants: HYUNDAI MOTOR COMPANY, Seoul (KR); KIA CORPORATION, Seoul (KR); AIP GmbH & Co. KG, Bayern (DE)

(72) Inventors: Ji Min Jeong, Seoul (KR); Helmut Moser, Bayern (DE)

(73) Assignees: HYUNDAI MOTOR COMPANY, Seoul (KR); KIA CORPORATION, Seoul (KR); AIP GMBH & CO. KG, Bayern (DE)

( * ) Notice: Subject to any disclaimer, the term of this patent is extended or adjusted under 35 U.S.C. 154(b) by 200 days.

(21) Appl. No.: 18/100,091

(22) Filed: Jan. 23, 2023

(65) Prior Publication Data

US 2024/0059299 A1 Feb. 22, 2024

(30) Foreign Application Priority Data

Aug. 16, 2022 (KR) .................. 10-2022-0102035

(51) Int. Cl.
*B60W 40/107* (2012.01)
*B60W 40/10* (2012.01)

(52) U.S. Cl.
CPC ...... *B60W 40/1005* (2013.01); *B60W 40/107* (2013.01)

(58) Field of Classification Search
CPC ...................... B60W 40/1005; B60W 40/107
See application file for complete search history.

(56) References Cited

U.S. PATENT DOCUMENTS

| | | | |
|---|---|---|---|
| 10,598,569 B2 | 3/2020 | Okada | |
| 11,035,757 B2 | 6/2021 | Bösl et al. | |
| 2020/0269705 A1 | 8/2020 | Okada et al. | |
| 2022/0082470 A1 | 3/2022 | Jeong et al. | |

FOREIGN PATENT DOCUMENTS

| | | |
|---|---|---|
| JP | 2018-025491 A | 2/2018 |
| JP | 2020-137378 A | 8/2020 |
| JP | 2021-096204 A | 6/2021 |
| JP | 2022-32556 A | 2/2022 |
| KR | 10-2022-0036530 A | 3/2022 |

*Primary Examiner* — Mathew Franklin Gordon
(74) *Attorney, Agent, or Firm* — MORGAN, LEWIS & BOCKIUS LLP

(57) ABSTRACT

A method for determining driving resistance in an insufficient warm-up state includes measuring driving data including at least first rolling resistance when a vehicle travels to include at least one constant-speed driving section in an insufficient warm-up state and determining a second rolling resistance based on the first rolling resistance measured in the constant-speed driving section, wherein the second rolling resistance is a rolling resistance predicted in the sufficient warm-up state.

15 Claims, 4 Drawing Sheets

METHOD OF DETERMINING DRIVING RESISTANCE IN INSUFFICIENT WARM-UP STATE

CROSS-REFERENCE TO RELATED APPLICATION(S)

The present application claims priority to Korean Patent Application No. 10-2022-0102035 filed on Aug. 16, 2022, the entire contents of which is incorporated herein for all purposes by this reference.

BACKGROUND OF THE PRESENT DISCLOSURE

Field of the Present Disclosure

The present disclosure relates to a method for determining driving resistance, such as rolling resistance and inertia resistance.

Description of Related Art

When a vehicle travels on a road, a force acting in a direction opposite to a traveling direction of the vehicle is referred to as driving resistance. In general, driving resistance acting on vehicles traveling on flat ground includes rolling resistance, inertia resistance, aerodynamic drag, and ventilation drag. By accurately measuring driving resistance, fuel efficiency of a vehicle may be accurately measured and required energy and the amount of improvement in fuel efficiency due to a change of vehicle parts may be precisely measured.

Here, rolling resistance and inertia resistance may be measured through a ground reproduction device including a belt and a drum or a chassis dynamometer device. According to a related art, to measure driving resistance, it is necessary to proceed with a warm-up step in which a tire is sufficiently preheated so that rolling resistance reaches an equilibrium state. If the warm-up step is not performed, as rolling resistance may continue to change during a driving resistance measurement process, rolling resistance and inertia resistance values cannot thus be measured stably. While a process of measuring substantial driving resistance generally takes about 30 minutes, the warm-up process takes about 1 hour to 1 hour and 30 minutes, so there may be a problem in that the warm-up time is considerably longer than the measurement time.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method for determining driving resistance, configured for determining driving resistance including at least one of rolling resistance and inertia resistance of a tire even in an insufficient warm-up state.

According to an aspect of the present disclosure, a method for determining driving resistance in an insufficient warm-up state includes: measuring driving data including at least first rolling resistance when a vehicle travels to include at least one constant-speed driving section in the insufficient warm-up state; and determining a second rolling resistance based on the at least one first rolling resistance measured in the at least one constant-speed driving section, wherein the second rolling resistance is a rolling resistance predicted in the sufficient warm-up state.

The insufficient warm-up state may include a state in which the at least one first rolling resistance measured in the at least one constant-speed driving section fluctuates beyond a preset range.

In the determining of the second rolling resistance, the second rolling resistance may be determined based on a change slope of the at least one first rolling resistance measured in the at least one constant-speed driving section and a magnitude of the at least one first rolling resistance.

The magnitude of the at least one first rolling resistance may be an average value of the at least one first rolling resistance measured in the at least one constant-speed driving section.

In the determining of the second rolling resistance, the second rolling resistance may be determined using a relational expression determined through a test before the measuring of the driving data, and the relational expression may be derived by applying Equation 3 based on at least one first rolling resistance data measured while the vehicle travels from the insufficient warm-up state to the sufficient warm-up state in a process of the test:

$$Y = Ax - B \qquad \text{(Equation 3)}$$

Here, Y is a difference between a third rolling resistance and the measured first rolling resistance, x is a slope of the measured first rolling resistance, A and B are constants determined based on x and Y obtained in the process of the test, and the third rolling resistance is a rolling resistance measured in the sufficient warm-up state during the process of the test.

The measuring of the driving data may include measuring the at least one first rolling resistance while the vehicle travels in at least two constant-speed driving sections, and the determining of the second rolling resistance may include determining the second rolling resistances based on a change slope of the at least one first rolling resistance and a magnitude of the at least one first rolling resistance in each constant-speed driving section; and determining an average value of the second rolling resistances determined in each constant-speed driving section.

According to another aspect of the present disclosure, a method for determining driving resistance in an insufficient warm-up state includes: measuring driving data of a vehicle, when the vehicle travels to include at least two driving sections having different accelerations in the insufficient warm-up state; and determining an inertia resistance determined as a product of an inertial mass and an acceleration based on the driving data measured in the at least two driving sections having the different accelerations, wherein the inertial mass is determined based on (i) a difference in the acceleration and (ii) a difference in a first rolling resistance in the at least two driving sections having the different accelerations.

The insufficient warm-up state may include a state in which the first rolling resistance fluctuates by more than a preset magnitude, while the driving data is measured to determine the inertia resistance.

The driving data may include driving data of a first section for measuring the inertia resistance and driving data of a second section for measuring the first rolling resistance, wherein the first section may include a section in which the vehicle accelerates or decelerates in at least two different accelerations in a certain speed section, and the second section may include a section in which the vehicle travels at a constant speed before and after the first section.

The difference in the first rolling resistance may be determined as a difference in an average value of the first rolling resistance measured in each of the driving sections having the at least two different accelerations.

The difference in the first rolling resistance may be determined on assumption that the first rolling resistance measured in an acceleration driving section changes linearly.

The difference in the first rolling resistance may be determined on assumption that driving times of the respective acceleration sections are a same.

The difference in the first rolling resistance may be 0.5 times a difference between first rolling resistance value measured in a constant-speed driving section before the acceleration driving section and first rolling resistance value measured in the constant-speed driving section after the acceleration driving section.

According to another aspect of the present disclosure, a computer-readable storage medium in which a program for executing the method for determining driving resistance in an insufficient warm-up state described above is recorded is provided.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
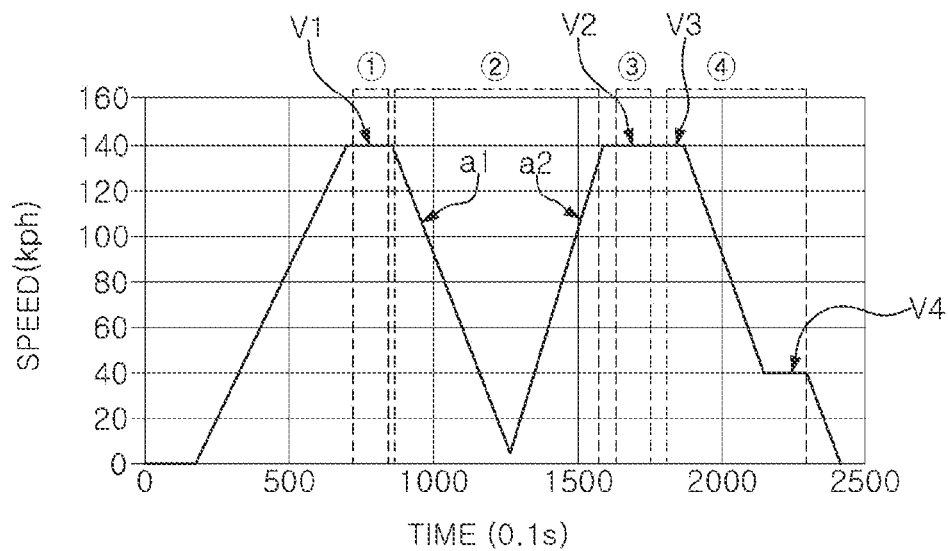
FIG. 1 is a graph illustrating the traveling speed of a vehicle according to a method for determining driving resistance in an insufficient warm-up state according to an exemplary embodiment in the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

While the present disclosure may be modified in various manners and take on various alternative forms, specific exemplary embodiments thereof are illustrated in the drawings and described in detail below. However, it may be understood that there is no intent to limit the present disclosure to the particular forms disclosed, but on the other hand, the present disclosure covers all modifications, equivalents, and alternatives falling within the spirit and scope of the present disclosure.

It will be understood that, although the terms "first," "second," etc. may be used herein to describe various elements, these elements may not be limited by these terms. These terms are only used to distinguish one element from another. For example, a first element could be termed a second element, and a second element could similarly be termed a first element without departing from the scope of the present disclosure. As used herein, the term "and/or" includes any and all combinations of one or more of the associated listed items.

The terminology used herein to describe exemplary embodiments of the present disclosure is not intended to limit the scope of the present disclosure. The articles "a," and "an" are singular in that they have a single referent, however the use of the singular form in the present specification should not preclude the presence of more than one referent. In other words, elements of the present disclosure referred to in the singular may number one or more, unless the context clearly indicates otherwise. It will be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Unless defined in a different way, all the terms used herein including technical and scientific terms have the same meanings as understood by those skilled in the art to which the present disclosure pertains. Such terms as defined in generally used dictionaries should be construed to have the same meanings as those of the contexts of the related art, and unless clearly defined in the application, they may not be construed to have ideally or excessively formal meanings.

Hereinafter, exemplary embodiments of the present disclosure will be described in detail with reference to the accompanying drawings.

FIG. 1 is a graph illustrating a driving speed of a vehicle according to a method for determining driving resistance in an insufficient warm-up state according to an exemplary embodiment in the present disclosure.

A method for measuring driving resistance according to an exemplary embodiment in the present disclosure may be performed through a ground reproduction device provided in a wind tunnel. However, the present disclosure is not limited thereto, and in the case of rolling resistance or inertia resistance, a chassis dynamometer device may be used, and an aerodynamic drag or a ventilation drag may be performed in a wind tunnel.

Figure 7:
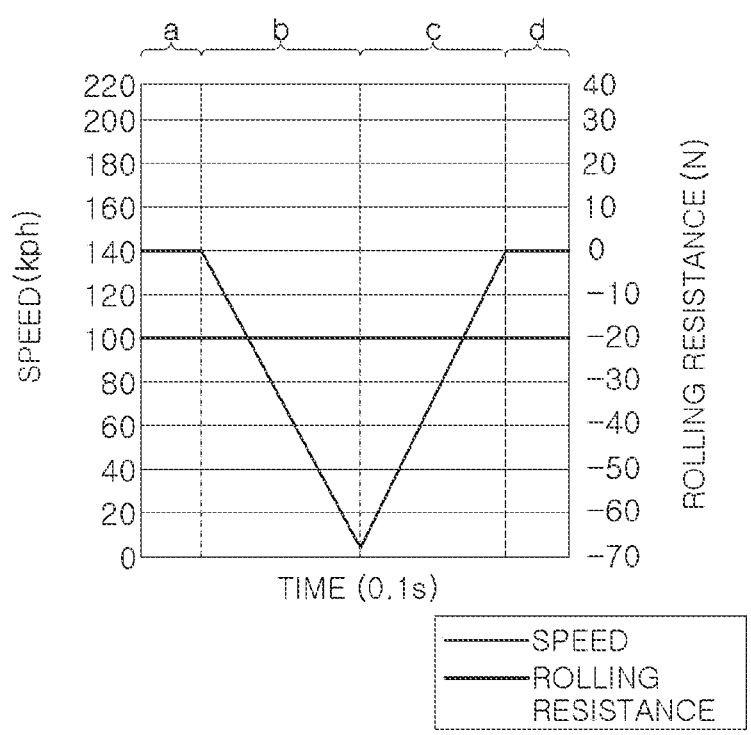
FIG. 7 is a graph illustrating changes in speed and rolling resistance of a vehicle in a state in which warm-up is sufficiently advanced.

Referring to FIG. 7 illustrating a portion of a process of measuring driving resistance according to the related art, in a state in which a vehicle tire is sufficiently warmed up, rolling resistance may have a constant value regardless of a change in speed of the vehicle. Here, FIG. 7 is a graph illustrating changes in speed and rolling resistance of a vehicle in a state in which warm-up has been sufficiently performed. Therefore, in the related art method of measuring driving resistance, the vehicle tire is sufficiently warmed up (for example, for one hour to one and a half hours), and then driving resistance is measured in a state in which rolling resistance is balanced. Through this, the rolling resistance may be measured stably.

Inertia resistance may be determined based on data obtained by driving the vehicle by at least two different accelerations in a predetermined speed section. As the inertia resistance utilizes a predetermined speed section, an aerodynamic drag and a ventilation drag in different acceleration sections have the same value, and rolling resistance also has the same value in a balanced state. That is, in determining a difference in driving resistance in different acceleration sections, rolling resistance, aerodynamic drag, and ventilation drag have the same values in different acceleration sections, so they may be offset. The difference in driving resistance values measured in different acceleration sections may be considered as a difference in inertia resistance, and it is unnecessary to consider rolling resistance, aerodynamic drag, and ventilation drag. Therefore, in the state in which warm-up is sufficiently performed, inertia resistance may be determined relatively simply. However, there is a problem in that the process of warming up the tire takes a long time, compared to a time for measuring inertia resistance, aerodynamic drag, or ventilation drag.

Accordingly, an exemplary embodiment in the present disclosure is directed to describe a method of predicting rolling resistance even in a state in which tire warm-up is not sufficiently performed (in an insufficient state) and measuring inertia resistance based on the prediction. Here, the state in which the warm-up is sufficiently performed may be a state in which a variation in rolling resistance measured for a preset time is maintained within a certain range. For example, in a case in which the preset time is 200 seconds and the variation range is ±1N, a state in which a variation of rolling resistance measured for 200 seconds is maintained within ±1N may be regarded as a sufficiently warm-up state. If rolling resistance exceeds the variation range, the warm-up may be insufficient, and the variation range of the rolling resistance may be set to various values in consideration of driving conditions in addition to ±1N.

Referring back to FIG. 1, a method for determining driving resistance according to an exemplary embodiment in the present disclosure may include a rolling resistance measurement process of traveling at a constant speed at a certain first speed V1, an inertia resistance measurement process of decelerating to a first acceleration a1 and accelerating to a second acceleration a2, an aerodynamic drag measurement process of traveling at a constant speed at a certain second speed V2, and a ventilation drag measurement process of traveling at a constant speed at a certain third speed V3 and at a fourth speed V4, different to the third speed V3. Here, the second speed V2 may be the same as the third speed V3 or the fourth speed V4, and in the instant case, the measurement process of the third speed V3 or the fourth speed V4 section may be replaced by the measurement process of the second speed V2. However, the third speed V3 and the fourth speed V4 cannot be the same.

Here, aerodynamic drag may be measured while traveling at a constant speed at the third speed V3 (e.g., 140 kph). A wind tunnel is a device made to measure an aerodynamic drag, and an aerodynamic drag may be generated by operating a fan in the wind tunnel and an aerodynamic drag may be identified by measuring a force by which the vehicle is pushed, and here, aerodynamic drag may be measured by applying various known methods configured for measuring aerodynamic drag.

Here, as ventilation drag, a ventilation drag of an unmeasured section may be determined based on driving data measured in the third speed V3 section and the fourth speed V4 section. Here, according to the graph illustrated in FIG. 1, the third speed V3 may be 140 kph and the fourth speed V4 may be 40 kph, but are not limited thereto. Furthermore, the second speed V2 may be a same as the third speed V3 or the fourth speed V4. In the instant case, the measurement process of the third speed V3 or the fourth speed V4 section may be replaced by the measurement process of the second speed V2. As illustrated in FIG. 1, when the second speed V2 and the third speed V3 are the same (e.g., 140 kph), driving data of the third speed V3 section may be replaced with driving data of the aerodynamic drag measurement section.

As for ventilation drag, a value of a ventilation drag coefficient may be determined using a ventilation drag theoretical formula, and ventilation drag may be determined based on the value of the ventilation drag coefficient. Expressing this as an equation, it may be determined as in Equation 1 below the value of the ventilation drag coefficient, and based thereon, a ventilation drag value at various speeds as in Equation 2 based thereon.

$$C_D = \frac{2}{\rho \times A} \times \left( \frac{F_{140\ kmh} - F_{40\ kph}}{V_{140\ kph}^2 - V_{40\ kph}^2} \right) \quad \text{[Equation 1]}$$

$$F_{x\ kph} = C_D \times A \times \frac{\rho}{2} \times \left( V_{140\ kph}^2 - V_{40\ kph}^2 \right) + F_{40\ kph} \quad \text{[Equation 2]}$$

Here, $C_D$ is ventilation drag coefficient, A is a front projected area (m$^2$) of the vehicle, $\rho$ is air density (kg/m$^3$), and V may be a speed (kph) of the vehicle.

Furthermore, the ventilation drag determined through Equation 2 may be corrected using a preset calibration sheet. Here, the aerodynamic drag and the ventilation drag may be measured without a warm-up process, and the method for measuring the aerodynamic drag or the ventilation drag is not limited to the method described above and various known methods may be applied.

Figure 2:
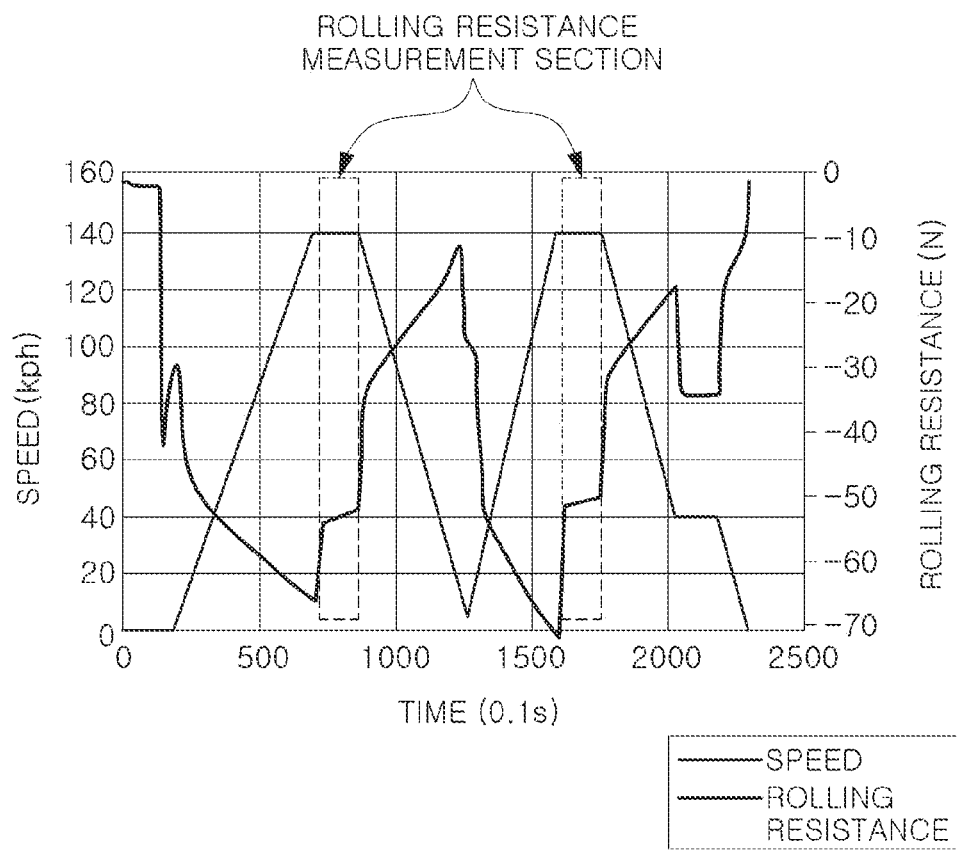
FIG. 2 is a graph illustrating changes in rolling resistance and speed in an insufficient warm-up state.

FIG. 2 is a graph illustrating changes in rolling resistance and speed in an insufficient warm-up state.

In the graph illustrated in FIG. 2, a section boxed with the dotted line may be a section for measuring rolling resistance. If rolling resistance is measured in a state in which the vehicle tire is not sufficiently warmed up, rolling resistance may change within a section in which the rolling resistance is measured, even when driving at a constant speed. Because the tire warm-up proceeds as the vehicle is driven, rolling resistance may change in an increasing direction even within the rolling resistance measurement section. In addition, if there are multiple rolling resistance measurement sections in an insufficient warm-up state, the rolling resistance in a subsequent measurement time may be closer to rolling resistance in a state in which the rolling resistance is balanced. Furthermore, a magnitude of a change in the measured rolling resistance or a slope of the change may be changed for each measurement section in the plurality of rolling resistance measurement sections.

Using these characteristics, a relational expression for the magnitude of change in rolling resistance and a gradient of change in rolling resistance may be derived. Furthermore, using a relational expression derived from the results of an experiment in advance, rolling resistance predicted in an equilibrium state may be determined based on the data measured during the driving process. The principle of determining rolling resistance predicted in an equilibrium state by sufficiently performing warm-up based on the data measured in the insufficient warm-up state will be described in detail with reference to FIG. 3, FIG. 4, and FIG. 5.

Figure 3:
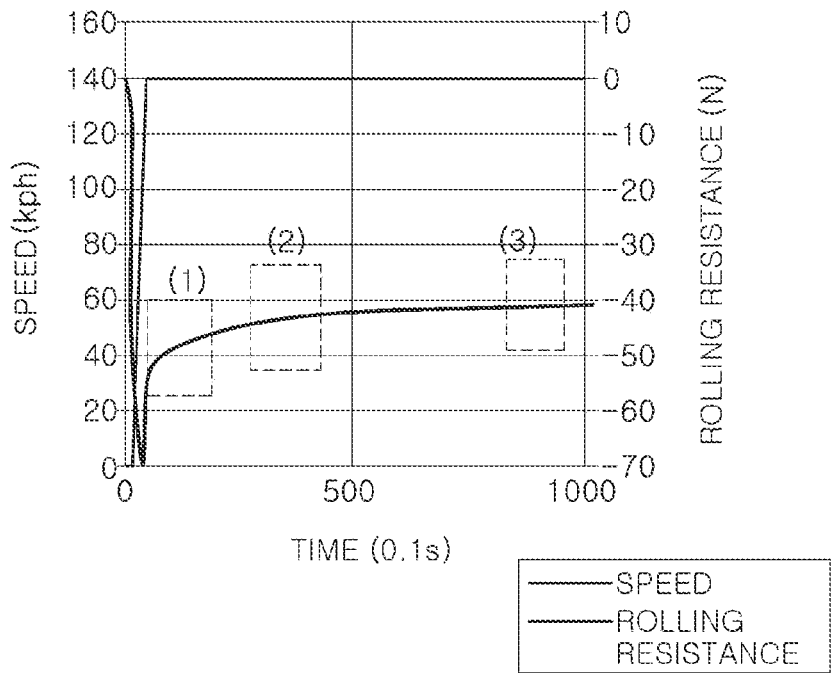
FIG. 3 is a graph illustrating a method of predicting rolling resistance according to an exemplary embodiment in the present disclosure.
Figure 4:
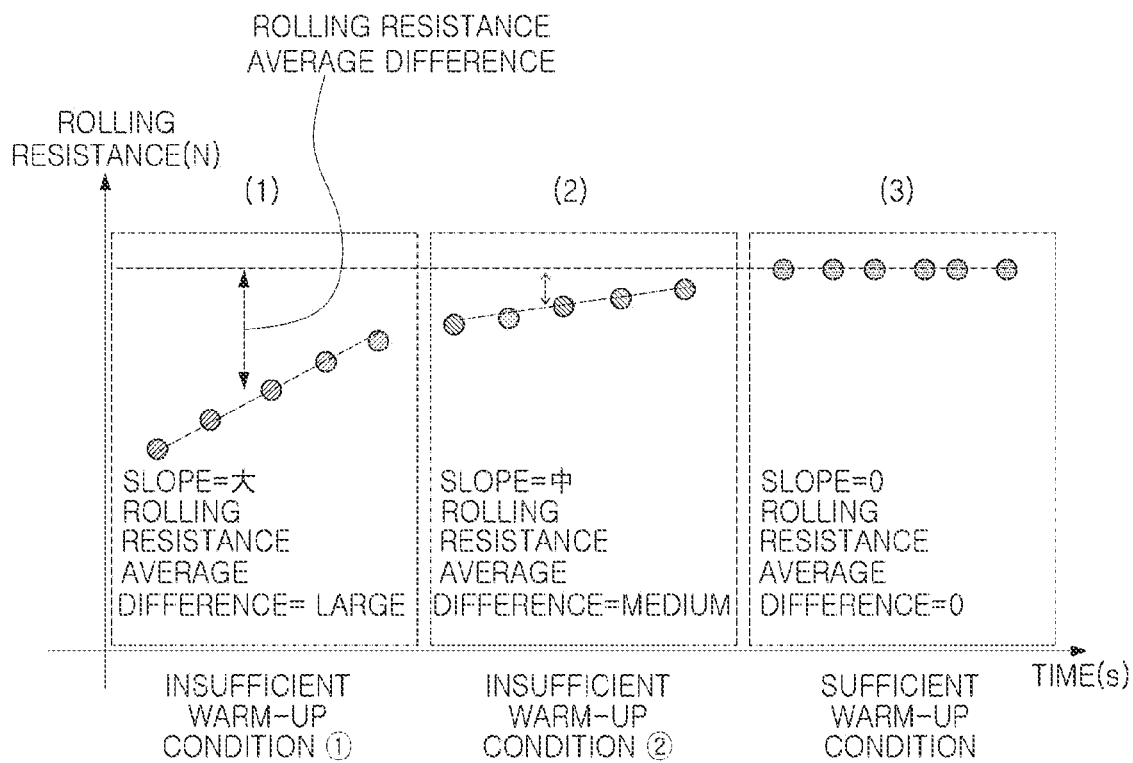
FIG. 4 is an enlarged graph of sections (1), (2), and (3) of FIG. 3.
Figure 5:
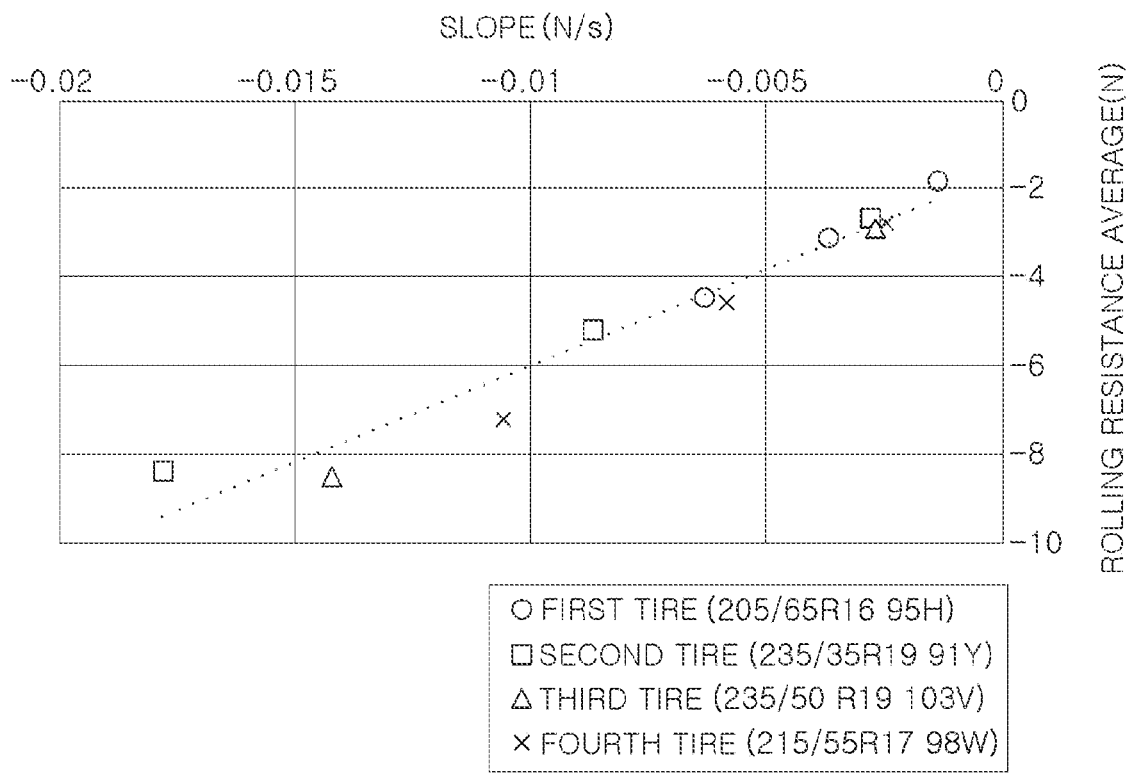
FIG. 5 is a graph illustrating deriving a rolling resistance relational expression according to an exemplary embodiment in the present disclosure.

FIG. 3 is a graph illustrating a method for predicting rolling resistance according to an exemplary embodiment in the present disclosure, FIG. 4 is an enlarged graph of sections (1), (2), and (3) of FIG. 3, and FIG. 5 is a graph illustrating deriving a rolling resistance prediction equation according to an exemplary embodiment in the present disclosure.

Referring to FIG. 3, it may be seen that, as described above, in a state in which warm-up is insufficient, rolling resistance does not establish equilibrium but changes. To check a change in rolling resistance during the tire warm-up process illustrated in FIG. 3 in more detail, some sections may be enlarged to be observed. As illustrated in FIG. 4, as in the randomly selected sections (1), (2), and (3) of FIG. 3, rolling resistance changes to increase with a steep slope initially, and then the slope gradually increases, reaching an equilibrium state in which the slope becomes approximately 0.

Here, the trend such as the graph illustrated in FIG. 3 generally changes as a temperature of the tire increases, and it may be seen that the rolling resistance exhibits the same change, regardless of specifications of the tire, for example, an aspect ratio of the tire, a structure of the carcass, the inch, and the like.

Referring back to FIG. 4, referring to each of the randomly extracted sections (1), (2), and (3), in section (1), an initial stage in which warm-up is not sufficiently performed, the slope of the change in rolling resistance is the largest and a difference between an average value of rolling resistance and a rolling resistance value in the equilibrium state in section (1) is also the largest. Next, in section (2) in which warm-up was not sufficiently performed but warm-up has proceeded further than in section (1) due to traveling, it may be seen that, the slope of the change in rolling resistance decreased compared to section (1) and the difference between the average value of the rolling resistance of section (2) and the value of the rolling resistance in the equilibrium state was also reduced. Finally, in section (3) in which the rolling resistance has reached the equilibrium state due to sufficient warm-up, the slope of the change in rolling resistance converges to 0 and the average value of the rolling resistance in section (3) is equal to the rolling resistance value in the equilibrium state. That is, referring to FIG. 3 and FIG. 4, it may be seen that, in the state in which the warm-up is not sufficiently performed, the slope of the rolling resistance in the section in which rolling resistance is measured decreases as the traveling time passes and the difference between the average value of the corresponding section and the rolling resistance in the equilibrium state also decreases. That is, it may be inferred that the slope of the rolling resistance in the measurement section and the difference between the measured rolling resistance and the rolling resistance in the equilibrium state may have a certain relationship. Therefore, when a relational expression between the slope of the change in rolling resistance and the difference between the rolling resistance value in the equilibrium state and the average value of the rolling resistance in the corresponding section is derived, the rolling resistance in the equilibrium state may be determined. Here, the rolling resistance value measured in a state in which the warm-up is not sufficiently performed may be referred to as first rolling resistance. Furthermore, rolling resistance in a state in which the predicted warm-up determined based on the first rolling resistance has been sufficiently performed, that is, in the equilibrium state, may be referred to as second rolling resistance. Furthermore, rolling resistance measured in the equilibrium state in which warm-up is sufficiently performed may be referred to as a third rolling resistance.

Based on the above characteristics, a relational expression may be derived by conducting a test in advance. Through the test, driving data is collected while driving from an insufficient warm-up state to a sufficient warm-up state, and a relational expression for determining the predicted rolling resistance (the second rolling resistance) under equilibrium conditions may be derived based on the collected data. Because the relational expression utilizes a difference between the equilibrium rolling resistance (the third rolling resistance) and the measured rolling resistance (the first rolling resistance), the test may include a process from starting in an insufficient warm-up state to a state in which warm-up is sufficient to obtain the equilibrium rolling resistance (the third rolling resistance).

Referring to FIG. 5, four tests were performed using a vehicle provided with 4 different types of tires and a relational expression was derived based on measurement data, but the present disclosure is not limited thereto and the relational expression may be derived using more types of tires.

Referring to FIG. 5, the graph shows data measured using a total of four types of wheels/tires to derive a relational expression for determining rolling resistance (the second rolling resistance) predicted under equilibrium conditions. In the graph illustrated in FIG. 5, the X-axis represents a slope of the measured rolling resistance (the first rolling resistance), and the Y-axis may represent a difference value between measured rolling resistance (the first rolling resistance) and rolling resistance in equilibrium (the third rolling resistance). That is, the relational expression may not be derived until the rolling resistance (the third rolling resistance) in the equilibrium state is measured through the test process.

Referring to FIG. 5, it may be seen that all tires exhibit the same tendency regardless of tire specifications. Furthermore, based on the values illustrated in FIG. 5, when the slope value of the measured rolling resistance (the first rolling resistance) is set to an X value and a difference value between the measured rolling resistance (the first rolling resistance) and rolling resistance in the equilibrium state (the third rolling resistance) is set to a Y value, a relational expression of a linear function between the X value and the Y value may be derived. Here, the linear function relational expression may be derived using linear regression analysis, but is not limited thereto, and various methods may be applied as long as it is a known technology configured for confirming a trend line.

The derived linear function relation also confirmed that the correlation coefficient value was 0.95 or more, indicating a high correlation between the X value and the Y value. Here, the correlation coefficient is a value indicating how the other variable corresponding to a change of one variable changes when two variables are measured, and indicates a value expressing the degree of correlation between the two variables as a kind of index.

In other words, the slope value of the measured rolling resistance (the first rolling resistance) is set to the X value and the difference between the measured rolling resistance (the first rolling resistance) and the rolling resistance in the equilibrium state (the third rolling resistance) is set to the Y value, data is collected, and a trend line of the collected data is generated. Here, when a trend line is derived using a linear regression analysis, a linear function relational expression such as Equation 3 below may be obtained.

$$Y=Ax+B \qquad \text{[Equation 3]}$$

Here, A and B may represent constant values, x may represent the change slope (N/s) of the measured rolling resistance (the first rolling resistance), and Y may represent the difference N between the measured rolling resistance (the first rolling resistance) and the rolling resistance measured in the equilibrium state (the third rolling resistance).

Through the test process, after deriving the linear functional relation such as Equation 3, it is possible to obtain a Y value by measuring the change slope of the measured rolling resistance (the first rolling resistance), which is the x value. Here, because the Y value refers to the difference between the measured rolling resistance (the first rolling resistance) and the rolling resistance in the equilibrium state, when the measured rolling resistance (the first rolling resistance) is subtracted from the Y value, the value of the rolling resistance predicted in the equilibrium state (the second rolling resistance) may be determined.

Therefore, once the relational expression is derived through the test, even when the warm-up is insufficient, the change slope of the rolling resistance and the magnitude of the rolling resistance may be measured and applied to the above relational expression, so that the predicted rolling resistance (the second rolling resistance) in the sufficient warm-up state may be determined.

Meanwhile, in the above, the magnitude of the rolling resistance measured in the constant-speed driving section is mainly described based on the average value of the section, but the present disclosure is not limited thereto, and values may be applied using various statistical methods, such as a median value and a mode value of the rolling resistance measured in the corresponding section.

Hereinafter, a method of measuring inertia resistance in a state in which warm-up is insufficient will be described with reference to FIG. 6 and FIG. 7.

Figure 6:
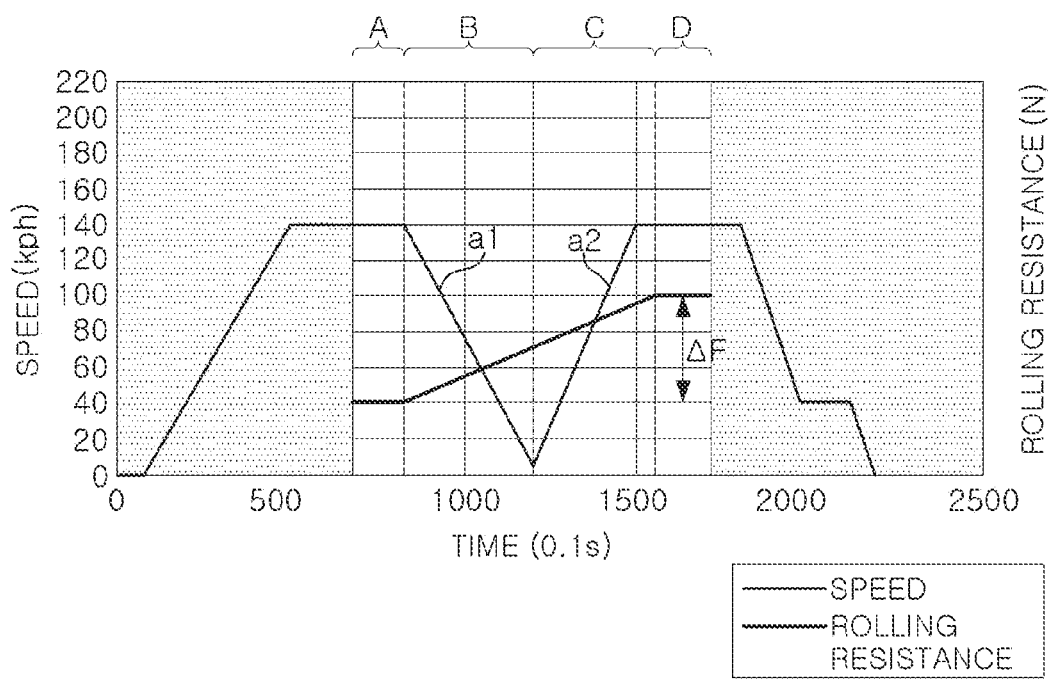
FIG. 6 is a graph illustrating changes in speed and rolling resistance of a vehicle in an insufficient warm-up state according to an exemplary embodiment in the present disclosure.

FIG. 6 is a graph illustrating changes in speed and rolling resistance of a vehicle in an insufficient warm-up state according to an exemplary embodiment in the present disclosure, and FIG. 7 is a graph illustrating changes in speed and rolling resistance of a vehicle in a state in which warm-up is sufficiently advanced.

Driving resistance measured through a device (e.g., a load cell of a chassis dynamo) for measuring driving resistance may be expressed in Equation 4 below.

$$F_{lc}=F_f+m_l a+F_a+F_v \qquad \text{[Equation 4]}$$

Here, $F_{lc}$ may be a total measured driving resistance value, $F_f$ may be the rolling resistance value, $m_l a$ may be an inertia resistance value, $m_l$ may be an inertial mass, a may be a traveling acceleration, $F_a$ may be an aerodynamic drag value, and $F_v$ may be a ventilation drag value.

Referring to FIG. 7, in a state in which warm-up is sufficiently performed, data may be measured while driving at least two different accelerations in sections (section B and section C) for measuring inertia resistance. Here, when the warm-up is sufficiently performed, rolling resistance is in equilibrium. Furthermore, the aerodynamic drag and the ventilation drag use the average value within the same speed section. That is, the rolling resistance, aerodynamic drag, and ventilation drag values in the sections (section B and section C) for measuring the inertia resistance are the same regardless of the magnitude of the acceleration. Therefore, when determining a difference in the values of driving resistance measured in different acceleration sections, the rolling resistance, aerodynamic drag, and ventilation drag values of both sections cancel each other out, and the difference in the measured driving resistance values at different accelerations is a difference in inertia resistance. If this is arranged for the inertial mass, it may be expressed as Equation 5.

$$m_1 = \frac{F_{lc,b} - F_{lc,c}}{a_b - a_c} \qquad \text{[Equation 5]}$$

As illustrated in FIG. 6, a case in which rolling resistance does not reach the equilibrium state due to insufficient warm-up of the tire will be described. Because aerodynamic drag and ventilation drag use average values within the same speed section, they may have the same value in different acceleration sections regardless of acceleration. However, in a state in which the warm-up is insufficiently performed, the rolling resistance is not balanced, so that the rolling resistances in different acceleration sections are different. Therefore, to determine the inertial mass in an insufficient warm-up state, it is necessary to additionally determine the difference in rolling resistance.

In more detail, a driving resistance measured in a section (section B) in which the vehicle travels at an acceleration of a1 may be referred to as $F_{lc,B}$, and a driving resistance measured in a section (section C) in which the vehicle travels at an acceleration of a2 may be referred to as $F_{lc,C}$. Here, $F_{lc,B}$ may be the same as Equation 6, $F_{lc,C}$ may be the same as Equation 7, and the difference in driving resistance between the two sections (section B and section C) may be the same as Equation 8 by subtracting $F_{lc,C}$ from $F_{lc,B}$.

$$F_{lc,B}=F_{f,B}+m_l a_1+F_{a,B}+F_{v,B} \qquad \text{[Equation 6]}$$

$$F_{lc,C}=F_{f,C}+m_l a_2+F_{a,C}+F_{v,C} \qquad \text{[Equation 7]}$$

$$F_{lc,B}-F_{lc,C}=(F_{f,B}-F_{f,C})+m_l(a_1-a_2) \qquad \text{[Equation 8]}$$

Because the aerodynamic drag and the ventilation drag use the average value within the same speed section, $F_{a,B}$ and $F_{a,C}$ and $F_{v,B}$ and $F_{v,C}$ use the same value to be canceled out in Equation 8. Referring to Equation 8, unlike a state in which warm-up is sufficiently performed, when warm-up is insufficiently performed, a difference in driving resistance in different acceleration sections may be a difference between inertia resistance and rolling resistance. Therefore, to measure the inertia resistance in a state in which the warm-up is insufficiently performed, constant-speed driving sections (section A and section D) for measuring rolling resistance may be further included before and after the acceleration driving sections (section B and section C) for measuring inertia resistance. Here, the acceleration driving sections (section B and section C) may be referred to as a first section, and sections (section A and section D) for measuring rolling resistance may be referred to as a second section.

First, a method of determining a difference in rolling resistance will be described. The difference between the rolling resistance of the acceleration a1 section (section B) and the rolling resistance of the acceleration section a2 section (section C) may be determined as a difference between the average value of the rolling resistance in each section. That is, an average rolling resistance of the acceleration a1 section (section B) may be $F_{f,B}$ and an average rolling resistance of the acceleration a2 section (section C) may be $F_{f,C}$. Here, it may be assumed that the rolling resistance increases linearly in the acceleration driving section (section B and section C). Furthermore, although a required time is slightly different because the vehicle travels in the same speed section at different accelerations, it may be assumed that the required time of each acceleration section (section B and section C) is the same for the sake of simplification of determination.

Based on the above assumption, when the rolling resistance at a starting point of the acceleration a1 section (Section B) is F1, the average value $F_{f,B}$ of the rolling resistance of the acceleration a1 section (Section B) may be a value obtained by adding ¼ of the rolling resistance difference ΔF during the acceleration driving section to F1, and the average value $F_{f,C}$ of the rolling resistance of the acceleration a2 section (Section C) may be a value obtained by adding ¾ of the rolling resistance difference ΔF during the acceleration driving section to F1. Therefore, the difference in average rolling resistance in different acceleration sections may be ½ times the difference in rolling resistance ΔF during the acceleration driving section. That is, by determining the difference ΔF in rolling resistance before and after the acceleration driving section, the difference between the rolling resistance of the acceleration section a1 (section B) and the rolling resistance of the acceleration section a2 (section C) may be determined.

As the difference ΔF in rolling resistance before and after the acceleration driving section, the average value of the rolling resistance (the first rolling resistance) measured in the constant-speed driving sections (section A and section D) in which the rolling resistance may be measured may be used.

When Equation 8 is organized based on the contents described above, an expression such as Equation 9 for determining an inertial mass value based on driving data measured in an insufficient warm-up state may be derived.

$$m_1 = \frac{F_{ic,B} - F_{ic,C} + \frac{1}{2}\Delta F}{a_1 - a_2}$$ [Equation 9]

Meanwhile, the assumption that the rolling resistance increases linearly in the acceleration driving section and the required time for the different acceleration driving sections are the same is to simplify determination and reduce a load on a system, and the present disclosure is not limited to the above assumption, and instead, actually measured values of the rolling resistance may be used to measure the inertia resistance more accurately.

The warm-up time was adjusted using tires having various materials, structures, and sizes, the rolling resistance and inertia resistance in a state in which the warm-up is sufficiently performed was determined based on the driving data measured in a state in which the warm-up is insufficient according to an exemplary embodiment in the present disclosure, and the determined values were compared with the measured values of rolling resistance and inertia resistance after actually performing sufficient warm-up. As a result, it was confirmed that both the determined rolling resistance and inertia resistance had accuracy within a maximum error of 5% compared to the measured value in the state in which the actual warm-up was sufficiently performed. That is, it was confirmed that accurate rolling resistance and inertia resistance values may be determined without a warm-up process.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured for the present disclosure or may be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device may be configured to operate as at least one software module to perform the exemplary embodiments of the present disclosure, and vice versa.

The method of measuring rolling resistance and inertia resistance in an insufficient warm-up state according to an exemplary embodiment in the present disclosure has the advantage of shortening driving data measurement time, it is possible to reduce the measurement time from 1.5 hours to 2 hours to approximately 0.5 hours, including the time required to perform a sufficient warm-up, reducing the time for measuring the driving resistance per year by approximately 200 hours. Accordingly, an effect of significantly reducing costs such as wind tunnel usage fee and input fuel may be obtained.

Furthermore, according to an exemplary embodiment in the present disclosure, because the warm-up process is shortened, the procedure for adjusting the starting conditions (conditions for checking the warm-up state such as tire temperature and evaluation temperature) in the related art is unnecessary, and thus, the driving resistance measurement procedure may be simplified.

Furthermore, according to an exemplary embodiment in the present disclosure, it is possible to measure driving resistance including rolling resistance and inertia resistance in the equilibrium state of the tire regardless of the temperature of the tire (e.g., sub-zero temperature), so that the driving resistance measurement range may be expanded.

According to an exemplary embodiment in the present disclosure, at least one of the rolling resistance and the inertia resistance may be determined relatively accurately without sufficiently performing a warm-up process that takes a long time compared to the measurement process.

Furthermore, according to the exemplary embodiment in the present disclosure, by shortening the driving data measurement time, an effect of reducing manpower, fuel, and power consumption of measuring equipment according to an input time may be reduced.

In various exemplary embodiments of the present disclosure, a controller is configured to perform the exemplary embodiments of the present disclosure.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code that may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for determining driving resistance in an insufficient warm-up state, the method comprising:
   measuring driving data including at least first rolling resistance when a vehicle travels to include at least one constant-speed driving section in the insufficient warm-up state; and
   determining a second rolling resistance based on the at least one first rolling resistance measured in the at least one constant-speed driving section,
   wherein the second rolling resistance is a rolling resistance predicted in a sufficient warm-up state.

2. The method of claim 1, wherein the insufficient warm-up state includes a state in which the at least one first rolling resistance measured in the at least one constant-speed driving section fluctuates beyond a preset range.

3. The method of claim 1, wherein, in the determining of the second rolling resistance, the second rolling resistance is determined based on a change slope of the at least one first rolling resistance measured in the at least one constant-speed driving section and a magnitude of the at least one first rolling resistance.

4. The method of claim 3, wherein the magnitude of the at least one first rolling resistance is an average value of the at least one first rolling resistance measured in the at least one constant-speed driving section.

5. The method of claim 1, wherein,
   in the determining of the second rolling resistance, the second rolling resistance is determined using a relational expression determined through a test before the measuring of the driving data, and
   the relational expression is derived by applying Equation 3 based on first rolling resistance data measured while the vehicle travels from the insufficient warm-up state to the sufficient warm-up state in a process of the test:

$$Y = Ax - B \tag{Equation 3}$$

wherein Y is a difference between third rolling resistance and the measured first rolling resistance, x is a slope of the measured first rolling resistance, A and B are constants determined based on x and Y obtained in the process of the test, and the third rolling resistance is a rolling resistance measured in the sufficient warm-up state during the process of the test.

6. The method of claim 1,
wherein the measuring of the driving data includes measuring the at least one first rolling resistance while the vehicle travels in at least two constant-speed driving sections, and
wherein the determining of the second rolling resistance includes:
determining the second rolling resistances based on a change slope of the at least one first rolling resistance and a magnitude of the at least one first rolling resistance in each constant-speed driving section; and
determining an average value of the second rolling resistances determined in each constant-speed driving section.

7. A computer-readable non-transitory storage medium in which a program for executing the method for determining the driving resistance in the insufficient warm-up state of claim 1 is recorded.

8. A method for determining a driving resistance in an insufficient warm-up state, the method comprising:
measuring driving data of a vehicle, when the vehicle travels to include at least two driving sections having different accelerations in the insufficient warm-up state; and
determining an inertia resistance determined as a product of an inertial mass and an acceleration based on the driving data measured in the at least two driving sections having the different accelerations,
wherein the inertial mass is determined based on a difference in the acceleration and a difference in a first rolling resistance in the at least two driving sections having the different accelerations.

9. The method of claim 8, wherein the insufficient warm-up state includes a state in which the first rolling resistance fluctuates by more than a preset magnitude, while the driving data is measured to determine the inertia resistance.

10. The method of claim 8,
wherein the driving data includes driving data of a first section for measuring the inertia resistance and driving data of a second section for measuring the first rolling resistance, and
wherein the first section includes a section in which the vehicle accelerates or decelerates in at least two different accelerations in a predetermined speed section, and the second section includes a section in which the vehicle travels at a constant speed before and after the first section.

11. The method of claim 8, wherein the difference in the first rolling resistance is determined as a difference in an average value of the first rolling resistance measured in each of the at least two driving sections including at least two different accelerations.

12. The method of claim 11, wherein the difference in the first rolling resistance is determined on assumption that the first rolling resistance measured in an acceleration driving section changes linearly.

13. The method of claim 11, wherein the difference in the first rolling resistance is determined on assumption that driving times of respective acceleration sections are a same.

14. The method of claim 11, wherein the difference in the first rolling resistance is 0.5 times a difference between first rolling resistance value measured in a constant-speed driving section before acceleration driving section and first rolling resistance value measured in the constant-speed driving section after the acceleration driving section.

15. A computer-readable non-transitory storage medium in which a program for executing the method for determining the driving resistance in the insufficient warm-up state of claim 8 is recorded.

* * * * *